(12) United States Patent
Shafi

(10) Patent No.: US 8,539,171 B2
(45) Date of Patent: Sep. 17, 2013

(54) ANALYSIS AND TIMELINE VISUALIZATION OF STORAGE CHANNELS

(75) Inventor: Hazim Shafi, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 362 days.

(21) Appl. No.: 12/606,973

(22) Filed: Oct. 27, 2009

(65) Prior Publication Data
US 2011/0099329 A1    Apr. 28, 2011

(51) Int. Cl.
*G06F 12/00*        (2006.01)

(52) U.S. Cl.
USPC .......................................... 711/154; 715/808

(58) Field of Classification Search
USPC .......................................... 711/154; 715/808
See application file for complete search history.

(56) References Cited

U.S. PATENT DOCUMENTS

| | | | |
|---|---|---|---|
| 5,442,740 A | | 8/1995 | Parikh |
| 5,495,601 A * | | 2/1996 | Narang et al. .................. 1/1 |
| 7,031,928 B1 * | | 4/2006 | Cochran ...................... 705/7.11 |
| 7,216,116 B1 * | | 5/2007 | Nilsson et al. .................. 1/1 |
| 7,818,347 B2 * | | 10/2010 | Dettinger et al. ............. 707/799 |
| 7,925,773 B2 * | | 4/2011 | Sather et al. ................. 709/231 |
| 8,051,232 B2 * | | 11/2011 | Dees et al. .................... 710/107 |
| 2003/0006988 A1 | | 1/2003 | Alford, Jr. et al. |
| 2004/0111510 A1 * | | 6/2004 | Shoaib et al. ................. 709/224 |
| 2008/0209402 A1 * | | 8/2008 | Parkinson .................... 717/124 |

OTHER PUBLICATIONS

J. Chassin De Kergommeaux, et al. Pajé, an Interactive Visualization Tool for Tuning Multi-Threded Parallel Applications—Published Date: Jan. 20, 2000 http://citeseerx.ist.psu.edu/viewdoc/download-?doi=10.1.1.123.111&rep=rep1&type=pdf.
Wista Performance Diagnostic Console—Published Date: Feb. 2007 http://e-articles.info/e/a/title/Wista-Performance-Diagnostic-Console/ (2 pages).
Chapter 5. Oracle Performance Visualization Tools—Published Date: Aug. 20, 1998 http://techpubs.sgi.com/library/tpl/cgi-bin/getdoc.cgi?coll=0650&db=bks&fname=/SGI_Admin/PCP_ORACLE/ch05.html (5 pages).
hIOmon—The File I/O Performance Monitor—Published Date: 2009 http://www.hyperio.com/ (1 page).
Detailed Walkthrough—Retrieved Date: Sep. 29, 2009 http://msdn.microsoft.com/en-us/library/dd871243.aspx (7 pages).
Nikolai Joukov, et al., Operating System Profiling via Latency Analysis—Retrieved Date: Sep. 29, 2009 http://www.usenix.org/event/osdi06/tech/full_papers/joukov/joukov_html/ (21 pages).

* cited by examiner

*Primary Examiner* — Stephen Elmore
(74) *Attorney, Agent, or Firm* — Workman Nydegger

(57) ABSTRACT

The visualization of a storage access on a timeline that represents various disk access events, such as a storage read event, or a storage write event. The storage access timeline may be formulated using event data gathered regarding storage access events, such as storage read requests, or storage write requests. The timeline may be displayed in conjunction with non-storage events, such as thread events, process events, processor events, or such, in order to give a visual indication of what is causing the storage access events. There may even be a control for displaying an identification of the file being accessed for one or more of the storage access events. With a better understanding of correlation between storage access events and application operation, optimization of the application itself may be achieved to more efficiently interface with the storage medium.

20 Claims, 6 Drawing Sheets

ANALYSIS AND TIMELINE VISUALIZATION OF STORAGE CHANNELS

BACKGROUND

Computing systems are providing ever more complex and sophisticated functionality. Such functionality is often primarily driven by underlying software, which itself is becoming ever more complex. Application developers have the task of developing such software, and tuning performance to ensure efficient execution. Such application developers and others might also have an interest in evaluating software performance.

Application developers have a wide variety of tools at their disposal in order to author software. First, source code allows the application developer to author software using instructions that are more understandable and intuitive to a human than is binary or intermediate code. The source code is ultimately compiled and/or interpreted into binary to allow readability of the code by a computing processor. In addition, various authoring tools allow for various visualizations that allow a developer to have a good understanding of how the application is currently functioning. For instance, some authoring tools allow a programmer to step through the execution of a program, one line of source code at a time, and evaluate the values associated to various parameters and variables. Authors might also insert temporary lines of code within the design for use in debugging.

Storage channel input/output is a major contributor to application performance. Such storage channels may be for reading from a storage medium, or in the case of a read/write medium, writing to the storage medium. The storage medium might be, for example, a CD-ROM drive, a DVD drive, a disk drive, and so forth. For instance, often applications pause while storage input/output is being performed. One of the contributing factors that makes storage input/output analysis difficult is that storage input/output involves the file system, which is usually a service of the operating system. This means that it is also difficult to trace a storage input/output request all the way through the system, making correlation to the application difficult. Another challenge is that storage input/output can result from indirect actions by the application or the operating system. For example, disk input/output can result when an application access a memory location that causes a page fault, when instructions from a dynamically linked library need to be loaded into memory, or when virtual memory operations are being performed by the operating system, and so forth.

BRIEF SUMMARY

Embodiments described herein relate to the analysis and visualization of a storage access timeline that represents various storage access events, such as storage read events, or storage write events. The disk access timeline may be formulated using event data gathered during execution regarding storage access events, such as a storage read request, or a storage write request. The timeline may be displayed in conjunction with non-storage events, such as thread events, process events, processor events, or such, in order to give a visual indication of what is causing the storage access events. There may even be a control for displaying an identification of the file being accessed for one or more of the storage access events. With a better understanding of correlation between storage access events and application operation, optimization of the application itself may be achieved to more efficiently interface with the storage medium.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, storage access timeline(s) is/are constructed based on underlying event data recorded during execution of an application program, when storage access events occur. First, some introductory discussion regarding computing systems will be described with respect to FIG. 1. Then, various embodiments of the rendering of storage access timelines will be described with reference to FIGS. 2 through 6.

Figure 1:
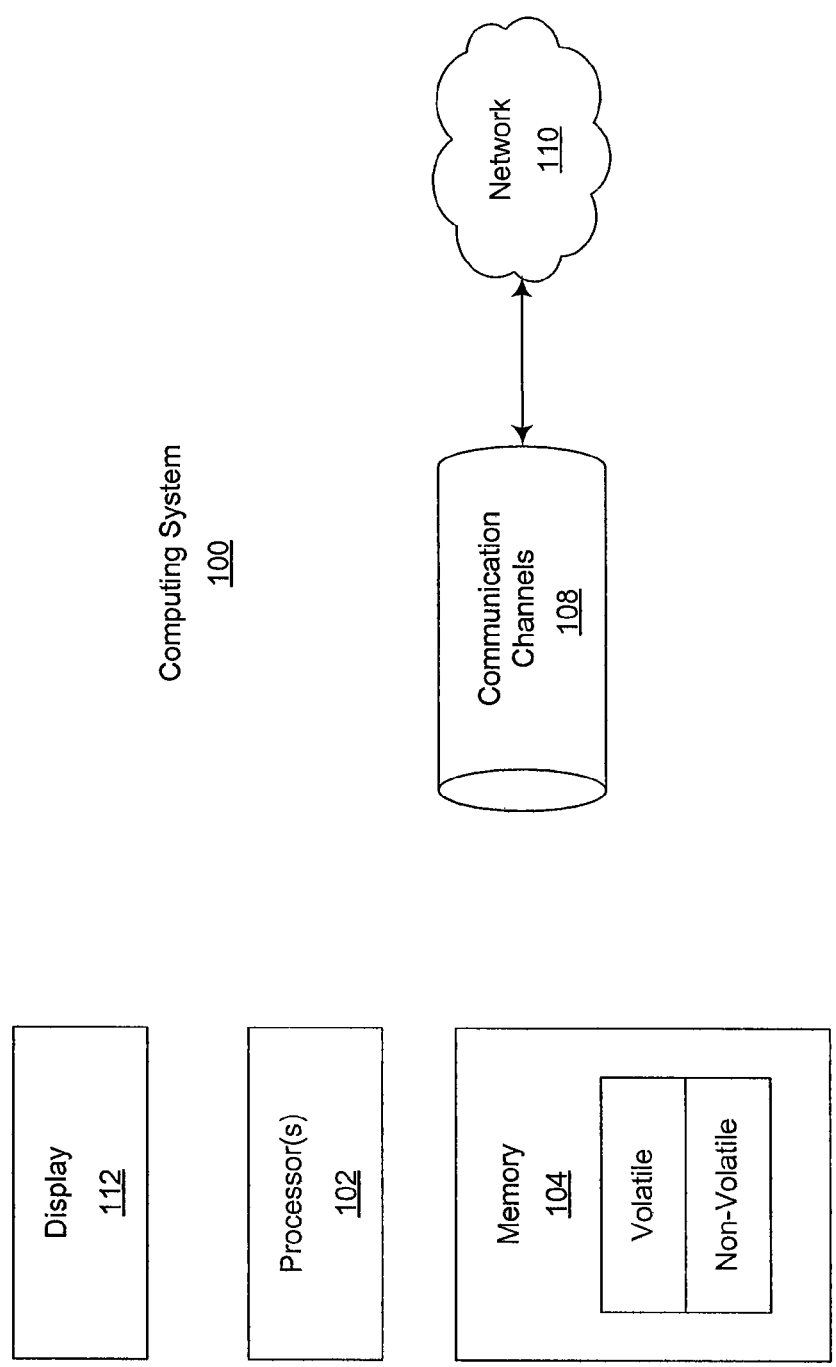
FIG. 1 illustrates an example computing system that may be used to employ embodiments described herein.

First, introductory discussion regarding computing systems is described with respect to FIG. 1. FIG. 1 illustrates a computing system, which may implement a message processor in software. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media, which physical storage media may be accessed, and the storage access events being analyzed and visualized as described herein. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Optionally, the computing system may include a display 112 for displaying visualizations. For instance, if the computing system performs the method 200 of FIG. 2, the visualization of the disk access timeline of the execution of the target program may be rendered at the computing system 100. Having described a computing system that may be used to implement features of the principles described herein with respect to FIG. 1, embodiments of the formulation of a timeline of disk access events will be described with respect to FIGS. 2 through 6.

Figure 2:
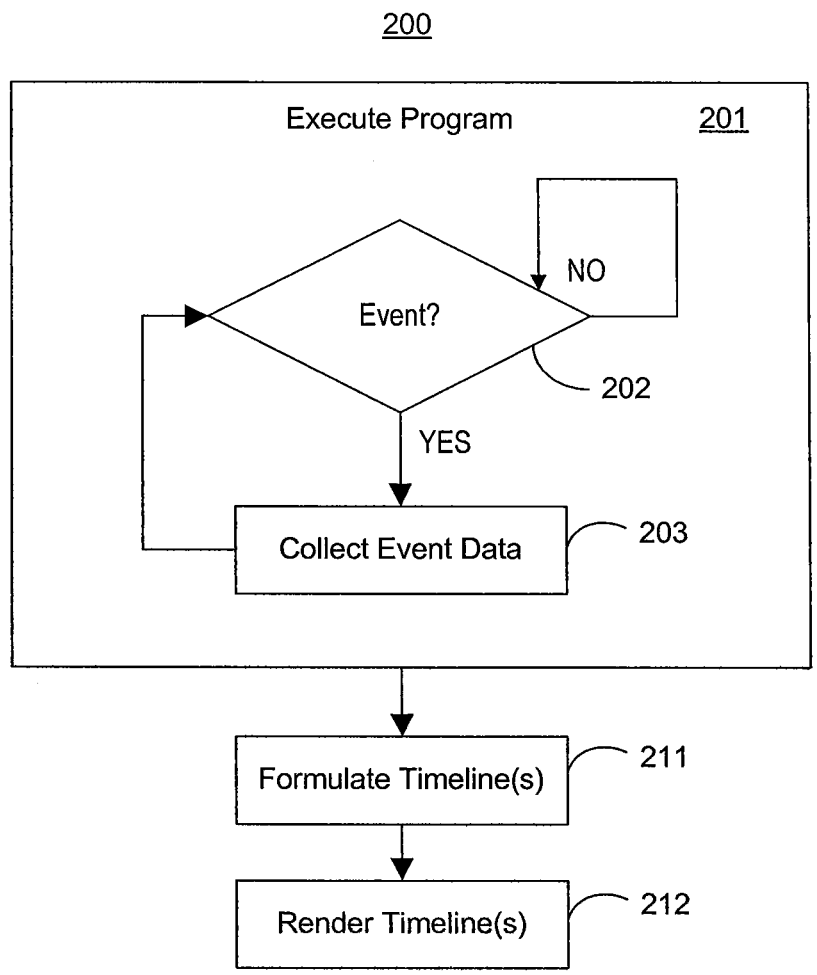
FIG. 2 illustrates a flowchart of a method for a computing system to display a visualization of a storage access timeline.

FIG. 2 illustrates a flowchart of a method 200 for a computing system to analyze and display a visualization of a storage access timeline. The method 200 is performed upon execution of an application program (act 201) that is being evaluated. The method 200 may be performed by the computing system 100 of FIG. 1, which may have one or more storage mediums that are accessed to support the execution of the application program. It is these storage accesses that are to be evaluated as part of the overall evaluation of the application program. The storage media may include, for example, disk drives, CD-ROM drives, DVD drivers, or any other medium that can persistently hold data that can be read therefrom and/or can be written thereto.

During execution (act 201) of the application program, the storage medium or media may be accessed multiple times. This is symbolically represented by the decision block 202 internal to the act 201. At least some, and preferably all, of the times that the execution (act 201) results in a storage access event (Yes in decision block 202). In such a case, event data may be collected corresponding to the storage access (act 203). The event data may be any data that is helpful to constructing a storage access timeline, and populating the timeline with information that may be used to evaluate the program operation. As an example, such event data may include 1) the type of storage access request (e.g., read versus write), 2) the time that the storage access was initiated, 3) the storage medium identity that is being accessed (e.g., disk 0, disk 1, CD-ROM 0, CD-ROM 1, DVD-0, DVD-1, and so forth), 4) the identifier for the file that is being accessed, 5) the identifier for the thread that initiated the request, 6) the identifier for the process that initiated the request, 7) the state of the callstack at the time of the storage access, and so forth. The system may assign an identifier for the storage access request, which may also be recorded. Also, upon a storage access request completing, further event data may be gathered such as 1) the identifier for the storage access that was assigned by the system, 2) the time that the storage access was completed, and 3) the number of bytes involved in the request (i.e., the number of bytes read, or the number of bytes written). The latency of the storage access request may be computed from the event data for the initiation and completion of a storage access request. The generation of such events may be performed, for example, using the Event Tracing for Windows (ETW) tracing mechanism in the case of an application program that runs using the MICROSOFT® WINDOWS® operating system. In any case, regardless of whether the application may be run in WINDOWS or not, there may be an underlying infrastructure that allows for configuring of generated events.

If there were a single storage medium, then there may be storage read requests in which data is read from the storage medium, and storage write requests in which data is written to the storage medium. If there are multiple storage media available to the computing system executing the application program, then there may be storage read and storage write requests for each of the available storage media. Of course, this means that there might be multiple concurrent storage access requests in which at least a portion of one storage access request overlaps all or a portion of each of one or more other storage access requests. Further, even within a single storage medium, there might be overlapping storage accesses.

Figure 4:
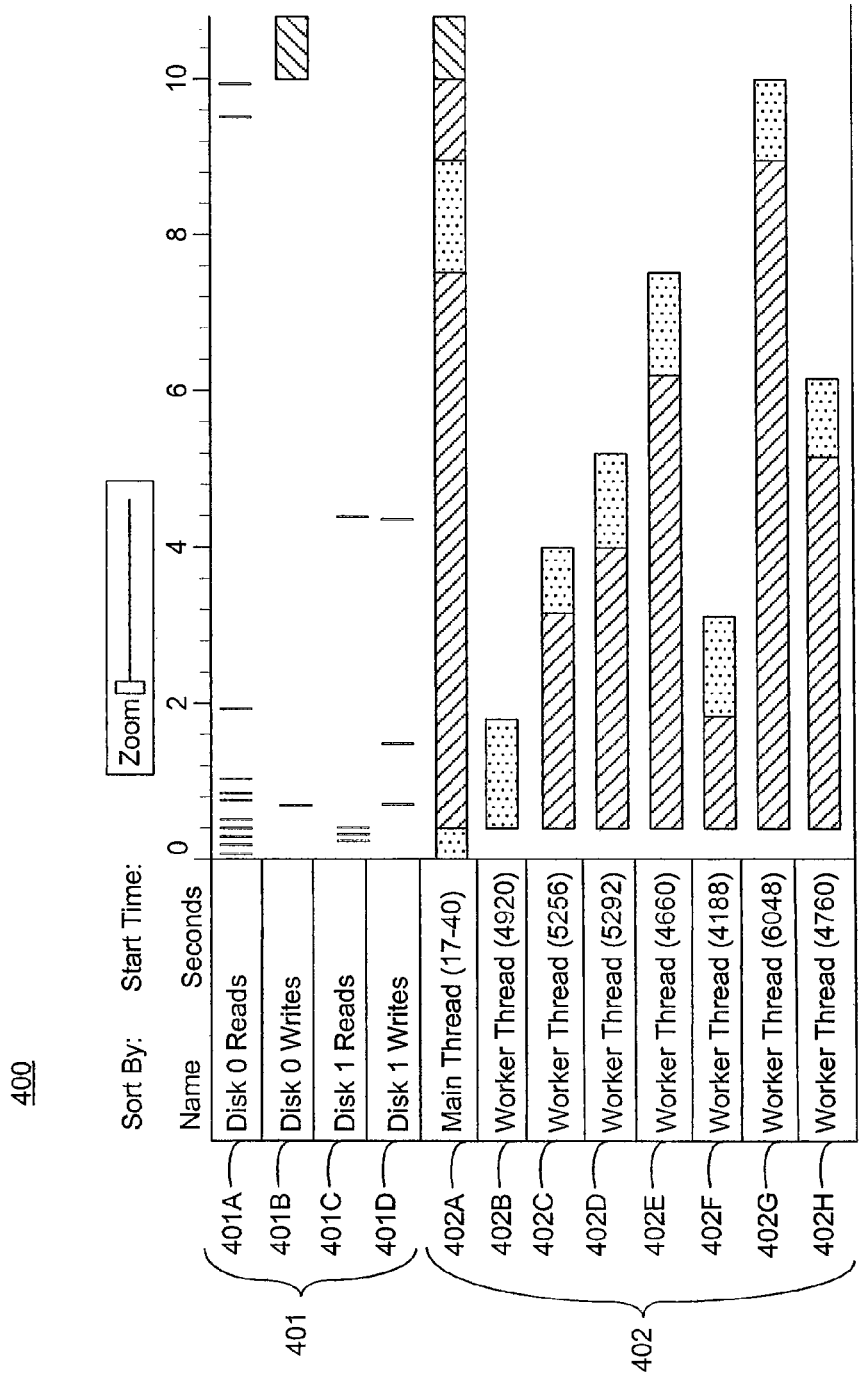
FIG. 4 illustrates an example user interface that might be displayed upon execution of the method of FIG. 2.
Figure 5:
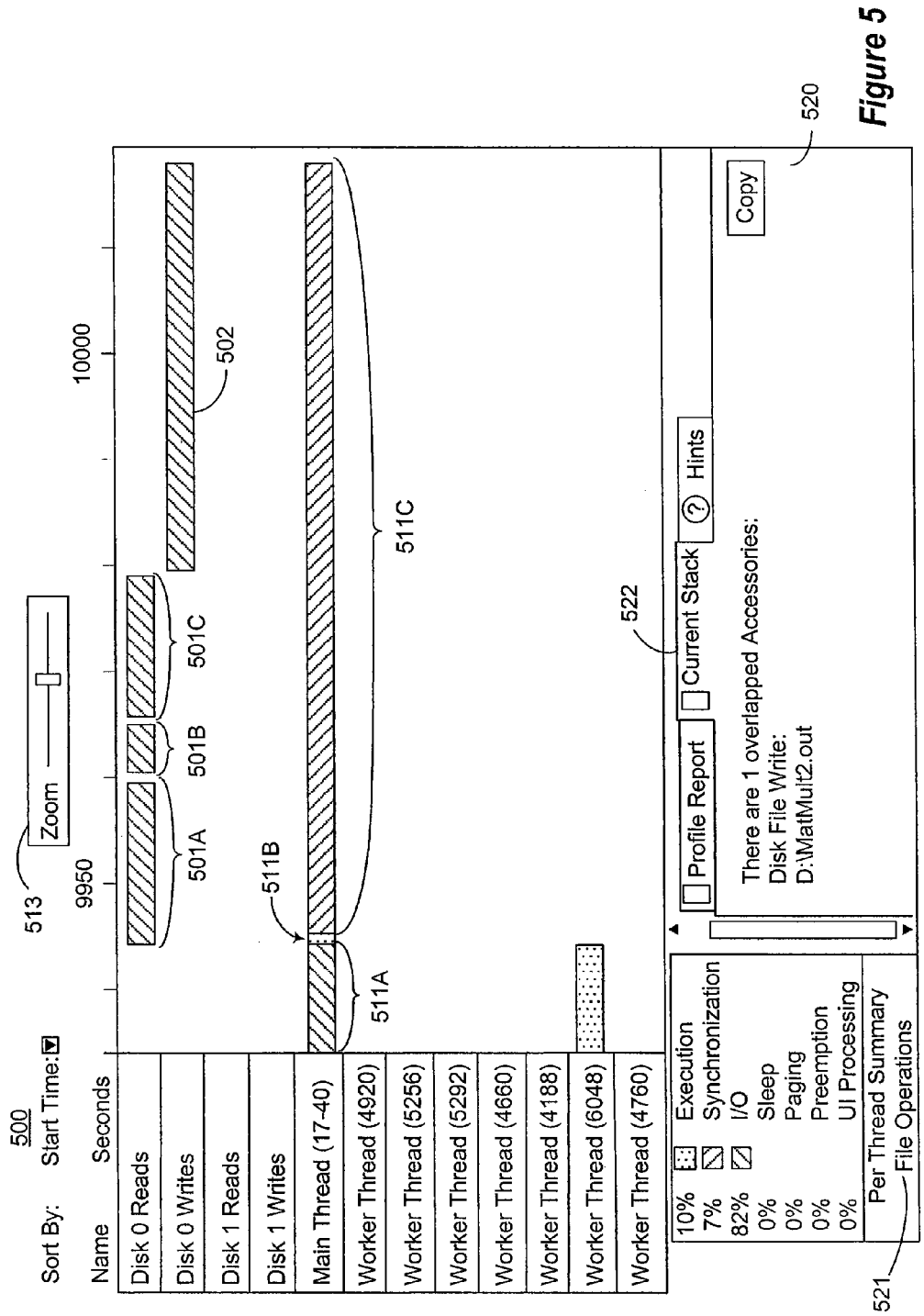
FIG. 5 illustrates a user interface that is similar to the user interface of FIG. 4 except that a framing control is manipulated to zoom into a particular portion of the timeline.

In one embodiment, the disk access timeline(s) are to be rendered along with one or more non-storage access timelines. The storage access timeline(s) and the non-storage access timeline(s) may be rendered using a common time reference. For instance, the non-disk access timelines might be thread timelines in which information regarding various thread events is illustrated. In the examples of FIGS. 4 and 5, the thread timelines are illustrated with a common time reference with the storage access timelines (in this case disk access timelines), with time represented uniformly across all timelines with horizontal spacing deterministically representing time across all timelines.

In order to construct such non-storage access timelines, event data regarding non-storage events are also collected during execution of the application program. For instance, if thread timelines are to be constructed, the event data might be 1) when an identified thread begins active execution, 2) when an identified thread ends active execution, and so forth. The timeline data might also include the state of the callstack at periodic intervals. The gathered data may be organized into a schema, which may even be a custom schema that is fully or partly defined by the evaluator. Of course, these are just examples of events from which a timeline of execution may be constructed. The principles described herein are not limited to the particular types of execution events. The non-storage events may also be generated using the ETW framework in the case of WINDOWS, or another type of underlying eventing framework in the case of application programs that do not run in WINDOWS.

Once the portion of the execution that is to be evaluated is completed, the storage access timeline(s) may be formulated (act 211) using at least a portion of the collected event data. For instance, if there were two storage media, each being written to, and each being read from, there may be a total of four timelines illustrated as in the case of FIG. 4. However, there might also be only two timelines illustrated, in which storage reads and storage writes are somehow distinguished from each other, perhaps by color. A storage read timeline may be constructed by using only the event data correspondence to storage reads for the storage medium of interest, and finding the corresponding start and end times for each storage read. Likewise, a storage write timeline may be constructed by using only the event data corresponding to storage writes for the storage media of interest, and finding the corresponding start and end times for each storage write. Non-storage timelines may also be constructed based on the time recorded for corresponding non-storage events (e.g., when a thread begins active execution, and when a thread ends active execution). The storage access timelines (and potentially the non-storage timelines) are then displayed (act 212).

Figure 3:
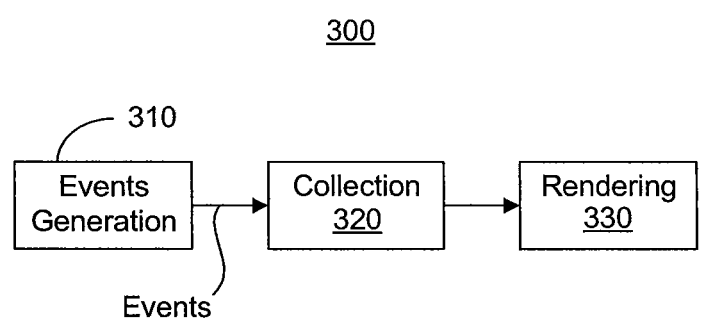
FIG. 3 illustrates an example architecture that may implement the method of FIG. 2.

FIG. 3 illustrates an example architecture 300 that may be instantiated in the memory of the computing system upon execution of the method 200 although some or all of the illustrated components may also be implemented in hardware or a combination or software and hardware to formulate a computer program product.

The architecture 300 includes an event generation module 310 configured to detect storage access events that occur during the execution of the target program, and generate timeline details of each of at least some of the detected storage access events. The events generation module 310 may also generate non-storage events as mentioned above. The ETW framework is an example of the events generation module 310.

A collections module 320 collects the timeline details of each of at least some of the detected storage access events or the other generated events. The collections module 320 may also evaluate and sort through the various events to formulate an in-memory representation of storage access timeline(s) and perhaps non-storage timeline(s).

The rendering module 330 renders the timelines formulated by the collections module 320, or perhaps itself interprets the collected timeline details of the generated events to first formulate an in-memory representation of the timeline(s).

FIG. 4 illustrates an example user interface 400 that might be displayed upon execution of the method 200 of FIG. 2. Here, four disk access timelines 401 are displayed including a disk read timeline 401A and a disk write timeline 401B corresponding to one disk (identified as "Disk 0"), and a disk read timeline 401C and a disk write timeline 401D timeline corresponding to another disk (identified as "Disk 1"). Here, approximately 11 seconds of execution are timelined.

A variety of non-disk timelines are also illustrated. In this case, eight thread timelines 402 are illustrated including a main thread timeline 402A, and seven worker thread timelines 402B, 402C, 402D, 402E, 402F, 402G and 402H. Here, various colors may represent different status for the corresponding thread or disk access channel. For instance, green rectangles (represented as being dot-filled) may represent an executing thread, red rectangles (represented as being diagonal-filled in one direction) may represent a non-executing thread, and pink rectangles (represented as being diagonal-filled leaning in the other direction) may represent a disk access event.

FIG. 5 illustrates a user interface 500 that is similar to the user interface 400 of FIG. 4 except that now a framing control 513 is manipulated to zoom into a particular portion of the timeline. Here, that portion is from about time 9.938 seconds to 10.042 seconds. At this granularity, one can distinguish three distinct disk reads 501A, 501B and 501C, and one distinct disk write 502. Also, one can distinguish that the main thread transitions from a non-executing synchronization state 511A, to a very brief executing state 511B. Then at the precise moment that the disk reads begin, the main thread transitions from an executing state 511B to the non-executing I/O state 511C (indicative of a thread that is waiting for some I/O to complete). For this, the evaluator can infer that the main thread caused the disk I/O, and that the main thread is waiting for the disk I/O to complete before continuing execution.

From this information, the evaluator may do a number of things, such as perhaps reconfiguring the program such that some other thread executes some non-dependent task while the main thread is waiting for the disk I/O to complete, thereby making the application program more efficient. Another thing that an evaluator can do is select the disk access range to identify the file being accessed. For instance, if selecting the rectangle 501A, the user might be displayed a report identifying the file being accessed.

Figure 6:
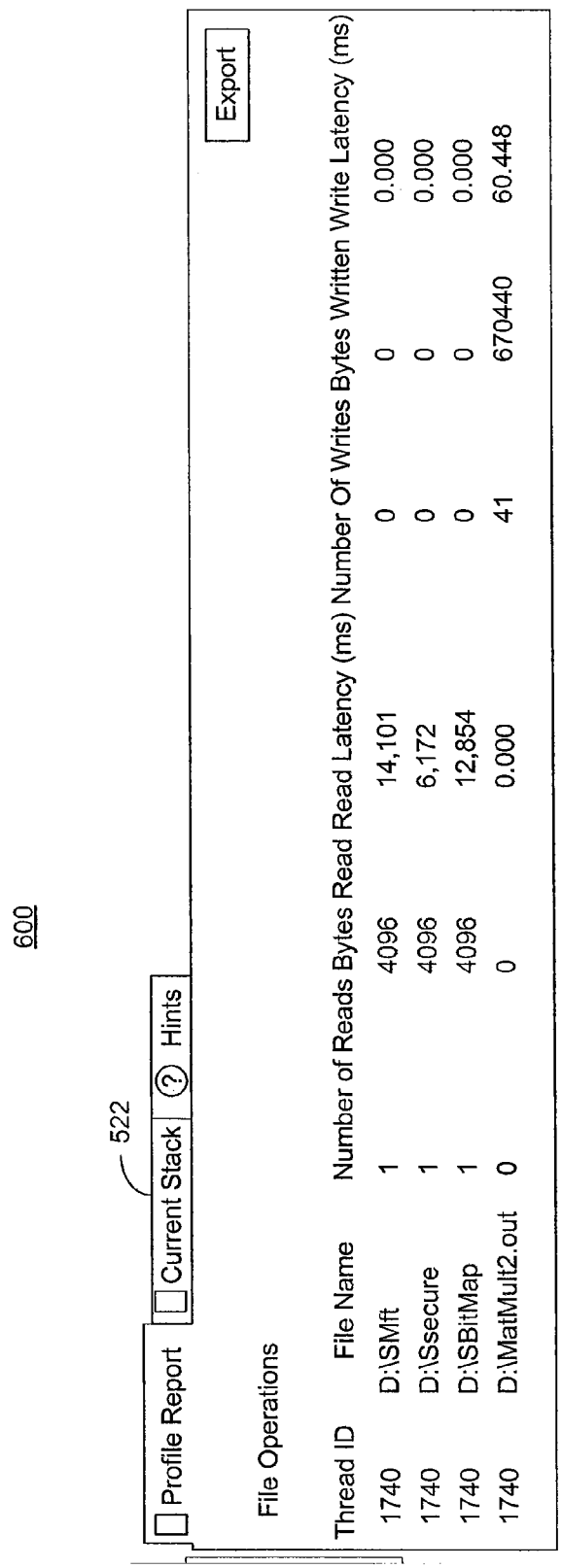
FIG. 6 illustrates a user interface that might replace the report frame of FIG. 5 if the profile report tab of FIG. 5 is selected.

FIG. 5 also illustrates a report frame 520 that illustrates information regarding the timeline being viewed. Here, the current stack tab 522 is selected to thereby illustrate the current stack of the timeline being illustrated. FIG. 6 illustrates a user interface 600 that might replace the report frame 520 if the File Operations text 521 is selected. Here, a report is presented that is organized by thread and filename. Each entry contains a summary of all access of the same file by the same thread, including the number of reads or writes, the number of bytes involved, and so forth. In the illustrated case of FIG. 6, there are four line-items, each representing a file that is accessed by worker thread 1740. Each line-item entry represents, from left to right, the thread identifier of the thread that initiated the disk access, the filename of the file being accessed by the disk access, the number of reads involved in the disk access (0 if the disk access is a disk write), the number of bytes read (0 if the disk access is a disk write), the read latency (0 if the disk access is a disk write), the number of writes involved in the disk access (0 if the disk access is a disk read), the number of bytes written (0 if the disk access is a disk read), and the write latency (0 if the disk access is a disk read).

Accordingly, the principles described herein permit an evaluator to understand detailed information regarding disk access requests that occur during execution of an application program, and further understand the various relationships between the disk accesses and other non-disk events, such as thread execution.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for a computing system to formulate and display a visualization of a storage access timeline, the method comprising:
    an act of a computing system executing an application program, wherein the execution of the application program results in a plurality of accesses to a storage medium, the computing system comprising at least one processor;
    for at least some of the plurality of accesses, an act of the computing system collecting event data corresponding to the storage accesses;
    an act of the computing system formulating a storage access timeline of at least a subset of the at least some of the plurality of accesses using at least a portion of the event data corresponding to the at least the subset; and
    an act of the computing system displaying a representation of the storage access timeline.

2. A method in accordance with claim 1, wherein the storage access timeline is displayed along with a non-storage timeline.

3. A method in accordance with claim 2, wherein the storage access timeline and the non-storage timeline are displayed in a common time reference.

4. A method in accordance with claim 2, wherein the non-storage timeline includes a plurality of timelines corresponding to each of a plurality of threads.

5. A method in accordance with claim 1, further comprising the following for at least one of the storage accesses of the at least the subset:
    an act of displaying a file being accessed by the corresponding storage access.

6. A method in accordance with claim 1, further comprising the following for at least one of the storage accesses of at least the subset:
    an act of displaying a representation of a latency of the corresponding storage access.

7. A method in accordance with claim 1, wherein at least one of the storage accesses is a disk access.

8. A method in accordance with claim 1, further comprising the following for at least a one of the disk accesses of the at least the subset:
    an act of displaying a file being accessed by the corresponding storage access; and
    an act of displaying a representation of a latency of the corresponding storage access.

9. A method in accordance with claim 1, wherein the storage access timeline includes a storage write timeline for a particular storage medium, and a storage read timeline for a particular storage medium.

10. A method in accordance with claim 1, wherein the storage access timeline includes at least one timeline for a first storage medium, and at least one timeline for a second storage medium.

11. A method in accordance with claim 1, further comprising:
    an act of providing a framing control that permits a user to narrow in on a particular subset of the storage access timeline.

12. One or more hardware storage device having stored thereon one or more computer-executable instructions that, when executed by one or more processor of a computing system during execution of a target program, cause the computing system to implement a method that includes the following:
    the computer system instantiating an events generation module configured to detect storage access events that occur during the execution of the target program, and generate timeline details of each of at least some of the detected storage access events;
    the computing system instantiating a collections module that collects timeline details of each of at least some of the detected storage access events; and
    the computing system instantiating a rendering module configured to interpret the collected timeline details and render a timeline of the storage accesses that occur during execution of the target program.

13. The one or more hardware storage device in accordance with claim 12, wherein the rendering module displays the storage access timeline along with a non-storage timeline using a common time reference.

14. The one or more hardware storage device in accordance with claim 13, wherein the collections module collects timeline details for non-storage access events, and the rendering module interprets the collected timeline details for the non-storage access events to thereby generate the non-storage timeline.

15. The one or more hardware storage device in accordance with claim 14, wherein the non-storage timeline includes a plurality of timelines corresponding to each of a plurality of threads.

16. The one or more hardware storage device in accordance with claim 12, wherein the rendering module is further configured to display at least one of the following for a given storage access:
    a file identifier being accessed by the corresponding storage access; and
    a representation of a latency of the corresponding storage access.

17. The one or more hardware storage device in accordance with claim 12, wherein the rendering module is further configured to display all of the following for a given storage access:
    a file identifier being accessed by the corresponding storage access; and
    a representation of a latency of the corresponding storage access.

18. The one or more hardware storage device in accordance with claim 12, wherein the rendering module is configured to simultaneously display at least one of the following for each of a plurality of concurrent storage accesses:
    a file identifier being accessed by the corresponding storage access; and a representation of a latency of the corresponding storage access.

19. The one or more hardware storage device in accordance with claim 12, wherein the rendering module is configured to simultaneously display all of the following for each of a plurality of concurrent storage accesses:
- a file identifier being accessed by the corresponding storage access; and
- a representation of a latency of the corresponding storage access.

20. A computing system comprising:
- at least one processor; and
- one or more storage device having stored computer-executable instructions which, when executed by the at least one processor, implement a method for formulating and displaying a visualization of a storage access timeline, wherein the method includes:
  - an act of the computing system executing an application program, wherein the execution of the application program results in a plurality of accesses to a storage medium;
  - for at least some of the plurality of accesses, an act of the computing system collecting event data corresponding to the storage accesses;
  - an act of the computing system formulating a storage access timeline of at least a subset of the at least some of the plurality of accesses using at least a portion of the event data corresponding to the at least the subset; and
  - an act of the computing system causing a display of a representation of the storage access timeline.

* * * * *